US009210562B2

(12) United States Patent
Kim et al.

(10) Patent No.: US 9,210,562 B2
(45) Date of Patent: Dec. 8, 2015

(54) METHOD AND APPARATUS FOR PROXIMITY DISCOVERY FOR DEVICE-TO-DEVICE COMMUNICATION

(71) Applicant: Research In Motion Limited, Waterloo (CA)

(72) Inventors: Joon Beom Kim, Carrolton, TX (US); Changhoi Koo, Plano, TX (US); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 289 days.

(21) Appl. No.: 13/856,969

(22) Filed: Apr. 4, 2013

(65) Prior Publication Data

US 2014/0302784 A1    Oct. 9, 2014

(51) Int. Cl.
| | |
|---|---|
| *H04B 7/00* | (2006.01) |
| *H04W 8/00* | (2009.01) |
| *H04W 76/02* | (2009.01) |
| *H04W 4/00* | (2009.01) |
| *H04L 12/26* | (2006.01) |

(52) U.S. Cl.
CPC ............ *H04W 8/005* (2013.01); *H04W 76/023* (2013.01); *H04L 43/0864* (2013.01); *H04W 4/008* (2013.01)

(58) Field of Classification Search
USPC ............... 455/41.2, 500, 517, 518, 519, 41.1, 455/41.3; 370/328
See application file for complete search history.

(56) References Cited

U.S. PATENT DOCUMENTS

| | | | |
|---|---|---|---|
| 7,412,518 | B1 | 8/2008 | Duigou et al. |
| 2012/0163235 | A1 | 6/2012 | Ho et al. |
| 2012/0213162 | A1 | 8/2012 | Koo et al. |
| 2013/0016629 | A1 | 1/2013 | Mallik et al. |
| 2013/0064138 | A1 | 3/2013 | Hakola et al. |
| 2013/0170398 | A1* | 7/2013 | Kwon ........................ 370/255 |

FOREIGN PATENT DOCUMENTS

WO    2012170794 A1    12/2012

OTHER PUBLICATIONS

Y. Chan and K. Ho, "A simple and efficient estimator for hyperbolic location," IEEE Transactions on Signal Process. vol. 42, pp. 1905-1915, Aug. 1994 (11 pages).
RP-122009; Study on LTE Device to Device Proximity Services, 3GPP RAN Plenary #58, Nov. 2012, Barcelona, Spain (6 pages).
3GPP TS36.211: Evolved Universal Terrestrial Radio Access (E-UTRA); Physical channel and modulation, (Release 10), v. 10.7.0, Mar. 15, 2013 (101 pages).

(Continued)

*Primary Examiner* — Nguyen Vo
(74) *Attorney, Agent, or Firm* — Fish & Richardson P.C.

(57) ABSTRACT

A method, network node, and user equipments for providing parameters to a first user equipment served by the network element, the parameters describing at least a second user equipment for the purpose of the first user equipment initiating a device to device proximity discovery service with the second user equipment, the method collecting information for user equipments desiring device to device proximity discovery; creating a candidate user equipment list for a candidate tier based on the collected information at the network element, wherein each candidate tier comprises one or more thresholds based on timing advance values in use at the first or the at least the second user equipment; and providing the parameters describing at least a second user equipment to the first user equipment.

25 Claims, 11 Drawing Sheets

(56) References Cited

OTHER PUBLICATIONS

3GPP TS36.212: Evolved Universal Terrestrial Radio Access (E-UTRA); Multiplexing and channel coding, (Release 10), v.10.7.0, Dec. 20, 2012 (79 pages).

3GPP TS36.213: Evolved Universal Terrestrial Radio Access (E-UTRA); Physical layer procedures, (Release 10), v.10.9.0, Mar. 15, 2013 (126 pages).

3GPP TS36.300: Evolved Universal Terrestrial Radio Access (E-UTRA) and Evolved Universal Terrestrial Radio Access Network (E-UTRAN); Radio Resource Control (RRC); Protocol specification (Release 10), v. 10.9.0, Jan. 2013 (194 pages).

Patent Cooperation Treaty, "International Search Report and the Written Opinion of the International Searching Authority," issued in connection with Application No. PCT/US2014/032013, mailed Nov. 3, 2014, 18 pages.

* cited by examiner

METHOD AND APPARATUS FOR PROXIMITY DISCOVERY FOR DEVICE-TO-DEVICE COMMUNICATION

FIELD OF THE DISCLOSURE

The present disclosure relates to device-to-device (D2D) techniques to provide link usage between mobile stations that are closely located, and in particular relates to proximity discovery for D2D communications.

BACKGROUND

Proximity-based services may be provided between two user equipments (UEs) having proximity service capabilities, and could be utilized for a variety of purposes. Such purposes could include public safety services, for example for providing various law enforcement officers or other public safety officers notice that other officers are in close proximity, relaying information between safety officers who are out of network coverage, retransmitting a safety officer's communications where the safety officer is out of coverage but the D2D UE is within network coverage, among others.

Non-public safety services may also be accommodated by D2D communications. These may include, for example, social media where two friends are in close proximity to each other and the UEs can communicate directly with each other, for providing services such as a UE in an automobile and a smart meter dealing directly with each other to help a driver find a parking spot, among other scenarios. Such use cases are, for example, described in the 3$^{rd}$ Generation Partnership Project (3GPP) Technical Report (TR) 22.803, "3$^{rd}$ Generation Partnership Project; Technical Specification Group Services and System Aspects; Feasibility Study for Proximity Services (proSe) (Release 12)" v12.1.0, March, 2013, the entire contents of which are incorporated herein by reference.

In order to utilize the D2D communication, proximity discovery may be used to identify potential UEs that are within close proximity to the UE desiring D2D communication. An efficient mechanism for proximity discovery is therefore desirable.

BRIEF DESCRIPTION OF THE DRAWINGS

The present disclosure will be better understood with reference to the drawings, in which.

DETAILED DESCRIPTION OF THE DRAWINGS

Figure 1:
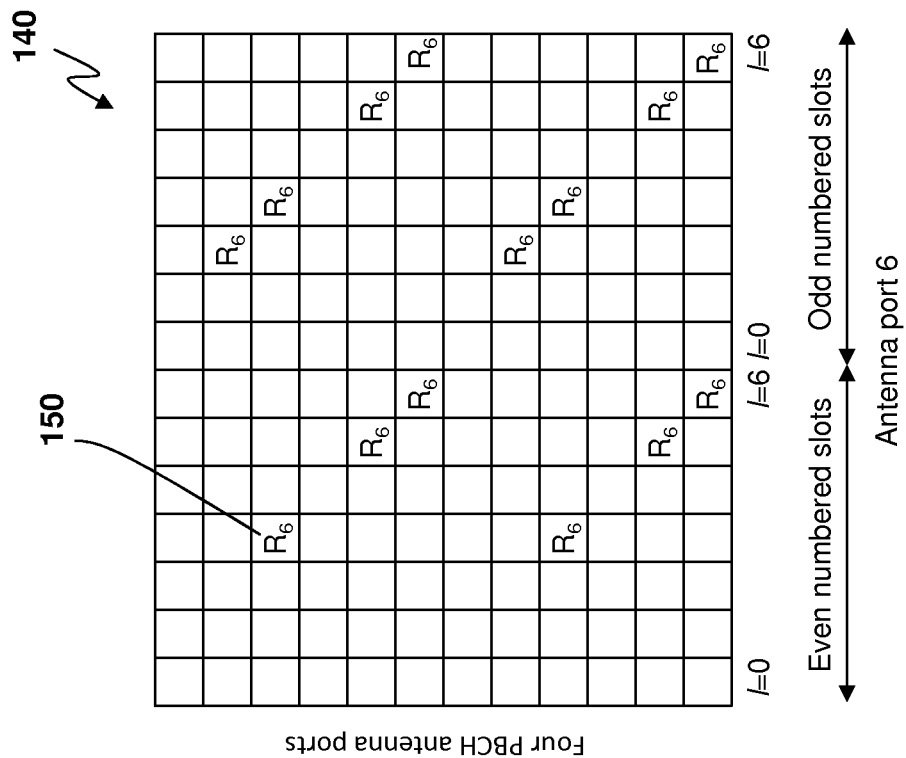
FIG. 1 is a block diagram showing resource blocks for one, two and four PBCH antenna ports with normal cyclic prefix and providing a mapping of positioning reference signals.
Figure 1:
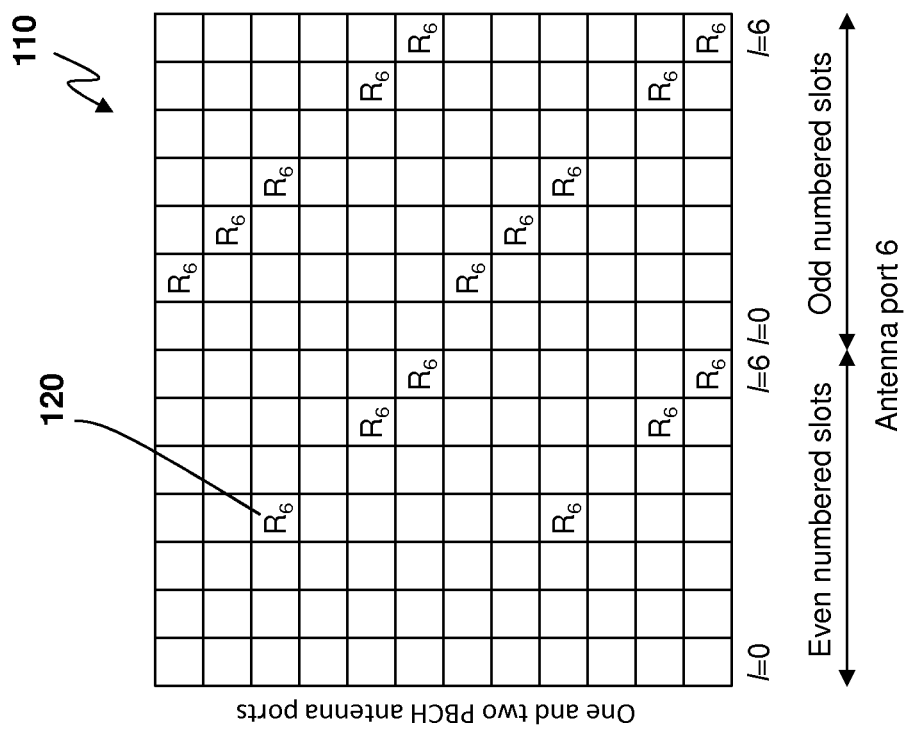

The present disclosure provides a method at a network element for providing parameters to a first user equipment served by the network element, the parameters describing at least a second user equipment for the purpose of the first user equipment initiating a device to device proximity discovery service with the second user equipment, the method comprising: collecting information for user equipments desiring device to device proximity discovery; creating a candidate user equipment list for a candidate tier based on the collected information at the network element, wherein each candidate tier comprises one or more thresholds based on at least one criterion from the first or the at least the second user equipment; and providing the parameters describing at least a second user equipment to the first user equipment.

The present disclosure provides a method at a network element for providing parameters to a first user equipment served by the network element, the parameters describing at least a second user equipment for the purpose of the first user equipment initiating a device to device proximity discovery service with the second user equipment, the method comprising: collecting information for user equipments desiring device to device proximity discovery; creating a candidate user equipment list for a candidate tier based on the collected information at the network element, wherein each candidate tier comprises one or more thresholds based on timing advance values in use at the first or the at least the second user equipment; and providing the parameters describing at least a second user equipment to the first user equipment.

The present disclosure further provides a network element for providing parameters to a first user equipment served by the network element, the parameters describing at least a second user equipment for the purpose of the first user equipment initiating a device to device proximity discovery service with the second user equipment, the network element comprising: a processor; and a communications subsystem, wherein the network element is configured to: collect information for user equipments desiring device to device proximity discovery; create a candidate user equipment list for a candidate tier based on the collected information at the network element, wherein each candidate tier comprises one or more thresholds based on at least one criterion in use at the first or the at least the second user equipment; and provide the parameters describing at least a second user equipment to the first user equipment.

The present disclosure further provides a network element for providing parameters to a first user equipment served by the network element, the parameters describing at least a second user equipment for the purpose of the first user equipment initiating a device to device proximity discovery service with the second user equipment, the network element comprising: a processor; and a communications subsystem, wherein the network element is configured to: collect information for user equipments desiring device to device proximity discovery; create a candidate user equipment list for a candidate tier based on the collected information at the network element, wherein each candidate tier comprises one or more thresholds based on timing advance values in use at the first or the at least the second user equipment; and provide the parameters describing at least a second user equipment to the first user equipment.

The present disclosure further provides a non-transitory computer readable medium storing program code executable by a processor for providing parameters to a first user equipment served by a network element, the parameters describing at least a second user equipment for the purpose of the first user equipment initiating a device to device proximity discovery service with the second user equipment, comprising: collecting information for user equipments desiring device to device proximity discovery; creating a candidate user equipment list for a candidate tier based on the collected information at the network element, wherein each candidate tier comprises one or more thresholds based at least one criterion in use at the first or the at least the second user equipment; and providing the parameters describing at least a second user equipment to the first user equipment.

The present disclosure further provides a non-transitory computer readable medium storing program code executable by a processor for providing parameters to a first user equipment served by a network element, the parameters describing at least a second user equipment for the purpose of the first user equipment initiating a device to device proximity discovery service with the second user equipment, comprising: collecting information for user equipments desiring device to device proximity discovery; creating a candidate user equipment list for a candidate tier based on the collected information at the network element, wherein each candidate tier comprises one or more thresholds based on timing advance values in use at the first or the at least the second user equipment; and providing the parameters describing at least a second user equipment to the first user equipment.

The present disclosure further provides a method at a network node to provide to a first user equipment parameters describing a second user equipment for the purpose of the first user equipment initiating a device to device proximity discovery service with the second user equipment, the method comprising: sending a request to the second user equipment; receiving a response from the second user equipment, including whether the second user equipment is willing to participate in proximity discovery; determining a candidate user equipment list for a tier of user equipments; and sending a second response to the first user equipment, wherein the determining is based on a threshold or set of thresholds using timing advance values in use at the first or the at least the second user equipment.

The present disclosure further provides a method at a network node to provide to a first user equipment parameters describing a second user equipment for the purpose of the first user equipment initiating a device to device proximity discovery service with the second user equipment, the second user equipment being served by a second network node, the method comprising: sending a request to the second network node; receiving a response from the second network node, including whether the second user equipment served by the second network node is willing to participate in proximity discovery; determining a candidate user equipment list for a tier of user equipments; and sending a second response to the first user equipment, wherein the determining is based on a threshold or set of thresholds using timing advance values in use at the first or the at least the second user equipment.

The present disclosure further provides a method within a network for providing to a first user equipment parameters describing a second user equipment for the purpose of the first user equipment initiating a device to device proximity discovery service with the second user equipment, the first user equipment being server by a first network node and the second user equipment being served by a second network node, the method comprising: receiving a request for proximity discovery at the second network node; sending a proximity discovery request from the second network node to the second user equipment; receiving a response at the second network node from the second user equipment, including whether the second user equipment is willing to participate in proximity discovery; and sending a proximity discovery response, including whether the second user equipment served by the second network node is willing to participate in proximity discovery, from the second network node to the first network node.

The present disclosure further provides a method at a network node to provide to a first user equipment parameters describing a second user equipment for the purpose of the first user equipment initiating a device to device proximity discovery service with the second user equipment, the method comprising: sending a request to the second user equipment; receiving a response from the second user equipment, including whether the second user equipment is willing to participate in proximity discovery; determining a candidate user equipment list for a tier of user equipments; and sending a second response to the first user equipment providing the parameters describing the second, wherein the tier of user equipments is determined based on a threshold or set of thresholds for the tier and further based on information received from the first user equipment and the second user equipment.

The present disclosure further provides a method at a first user equipment for receiving parameters describing at least a second user equipment for the purpose of the first user equipment initiating a device to device proximity discovery service with the second user equipment, the method comprising: sending a proximity discovery initiation request to a network node; and receiving the parameters describing at least the second user equipment from the network node.

The present disclosure further provides a first user equipment configured for receiving parameters describing at least a second user equipment for the purpose of the first user equipment initiating a device to device proximity discovery service with the second user equipment, the first user equipment comprising: a processor; and a communications subsystem, wherein the first user equipment is configured to: send a proximity discovery initiation request to a network node; and receive the parameters describing at least the second user equipment from the network node.

The present disclosure further provides a method at a first user equipment for receiving parameters describing at least a second user equipment for the purpose of the first user equipment initiating a device to device proximity discovery service with the second user equipment, the method comprising: receiving a proximity discovery initiation request from a network node; providing a proximity discovery initiation response from the first user equipment to the network node, the response including information about the first user equipment; and receiving the parameters describing at least the second user equipment from the network node.

The present disclosure further provides a first user equipment for receiving parameters describing at least a second user equipment for the purpose of the first user equipment initiating a device to device proximity discovery service with the second user equipment, the first user equipment comprising: a processor; and a communications subsystem, wherein the first user equipment is configured to: receive a proximity discovery initiation request from a network node; provide a proximity discovery initiation response from the first user equipment to the network node, the response including information about the first user equipment; and receive the parameters describing at least the second user equipment from the network node.

The present disclosure further provides a method at a second user equipment for proximity discovery by a first user equipment initiating a device to device proximity discovery service, the method comprising: receiving a proximity discovery initiation request from a network node; and providing a proximity discovery initiation response from the second user equipment to the network node, the response including information about the second user equipment.

The present disclosure further provides a second user equipment for proximity discovery by a first user equipment initiating a device to device proximity discovery service, the second user equipment comprising: a processor; and a communications subsystem, wherein the second user equipment is configured to: receive a proximity discovery initiation request from a network node; and provide a proximity discovery initiation response from the second user equipment to the network node, the response including information about the second user equipment.

The embodiments described herein are provided with examples using Long Term Evolution (LTE) networks and $3^{rd}$ Generation Partnership Project (3GPP) signaling. However, the present disclosure is not limited to such a network environment and the network environment is only being used as an example. Other network environments could equally be used with regard to the present disclosure.

Proximity discovery for D2D communications on an overlaid LTE network may be performed on either existing LTE signals or on new dedicated signals. Regardless of the signal format, various issues exist. First, as all UEs are synchronized with the serving cell for uplink (here, we are considering observation of uplink signals by anchor UE), different transmission timing values may be configured, thereby causing inter-user interference for D2D discovery due to the different arrival times of signals to the UEs desiring D2D communication (hereinafter referred to as anchor UEs) which want to discover proximity UEs (hereinafter referred to as target UEs), if uplink resources are utilized. Thus, an anchor UE is a UE that wants to discover proximity UEs, and a target UE is a UE that wants to be discoverable.

Similarly, if downlink resources and transmission timing references are used, the arrival time between downlink signals for cellular UEs and proximity discovery signals for D2D UEs may be different, thus resulting in potentially significant interference between both cellular and D2D UEs unless properly managed.

Further, without appropriate information, such as the identity of transmitted signals, anchor UEs may need to search for target UEs exhaustively or may need to detect the received signal power levels that the anchor UE can only detect having an identity from the received signals, which may cause significant signaling overhead for D2D UEs.

These and other issues are discussed below with regards to the embodiments of the present disclosure.

Location of the UE

In accordance with the various embodiments herein, one or both of the target UEs and anchor UEs need to know their position or the position of other UEs. Various techniques for discovering the location of a UE are described below.

A general method for finding the location of a UE is to use a global positioning system (GPS) receiver independently operating on the cellular networks. Further, in current LTE technology, several positioning methods for UEs are provided. In Release 8 of the LTE Standards, the location of a UE may be provided by assisted global navigation satellite system (A-GNSS) and enhanced cell ID based approaches with general purpose positioning protocols, known as secure user plane locations.

A-GNSS positioning relies on an accurate knowledge of the locations of satellites and the transmission times of signals. An A-GNSS receiver may measure the exact time at which the UE receives the signal of each satellite that can be detected. However, since GNSS receivers may not have highly accurate clocks, at least four satellites may need to be detected for the position estimation. To reduce battery drain for a UE, a cellular network may provide assistance data to UEs equipped with GNSS receivers.

A second technique to find a location of a UE is Observed Time Difference Of Arrival (OTDOA) positioning. OTDOA positioning is similar to GPS, but the signals measured by the UE are terrestrial downlink transmissions from networks such as cell sites. Unlike GPS positioning, the UE does not acquire an accurate reference time, but the position estimate is based on the received time difference of at least two pairs of cells. Thus, OTDOA in LTE networks is based on measuring the time difference observed by the UE receiver between the reference signals of both neighboring cells and the serving cell, which is known as a reference signal time difference (RSTD) measurement.

Mathematical methods may then be used to calculate the UE location. One factor for governing achievable performance of a cellular OTDOA system is whether signals to be measured can be detected by the UE sufficiently quickly and with sufficiently high probability. For example, some networks such as LTE networks may not work well with OTDOA positioning since in many cases the LTE network was designed for high-speed data services with good spectral efficiency. In such LTE networks, three cellular sites may not be detectable by the UE.

Furthermore, for OTDOA systems, fractional frequency reuse can make Release 8 synchronization signals and radio signals of distant neighboring cells undetectable by the UE, thereby preventing the RSTD measurement required by OTDOA from being made if the available signals are only those defined by the Rel-8 LTE specifications. Consequently, even if the UE is enabled to skip the detection of the synchronization signals by providing network assistance information, OTDOA may not work sufficiently well if it is only based on Release 8 cell-specific reference signals alone.

To deal with the issue of Release 8 cell-specific reference signals, a Positioning Reference Signal (PRS) is introduced in Release 9 LTE specifications. The special "positioning subframes" are designed to aid the detectability of neighbor cells by reducing interference and increasing the reference signal energy. Typically, such signals do not carry any physical downlink shared channel (PDSCH) data, but provide PRSs in addition to the Release-8 cell-specific reference signals.

PRSs may be transmitted in resource blocks in downlink subframes configured for positioning reference signal transmission. If both normal and Multicast-Broadcast Single Frequency Network (MBSFN) subframes are configured as positioning subframes within a cell, the orthogonal frequency division multiplex (OFDM) symbols in an MBSFN subframe configured for positioning reference signal transmissions may use the same cyclic prefix as that used in subframe #0. If MBSFN subframes are configured as positioning subframes within a cell, the OFDM symbols configured for positioning reference signals in the MBSFN region of these subframes may use extended cyclic prefix lengths.

In a subframe configured for positioning reference signal transmission, the starting positions of the OFDM symbols configured for positioning reference signal transmissions may be identical to those in a subframe which all OFDM symbols have the same cyclic prefix length as the OFDM symbols configured for PRS transmission.

Positioning reference signals are transmitted on antenna port 6 in one embodiment. The positioning reference signals may not be mapped to resource elements (k, l) allocated to physical broadcast channel (PBCH), primary synchronization signal (PSS) or secondary synchronization signal (SSS) regardless of the antenna port p. Positioning reference signals may be defined for $\Delta f=15$ kHz.

Reference is now made to FIG. 1 which shows an arrangement PRSs in a resource block (RB) having a normal cyclic prefix. In the embodiment of FIG. 1, the resource block OFDM matrix shows a PRS pattern that is designed to not overlap with the Physical Downlink Control Channel (PDCCH), nor with any cell-specific reference signals of any other antenna port. Thus, referring to FIG. 1, a resource block 110 is provided for one and two physical broadcast channel (PBCH) antenna ports and a resource block 140 is provided for the four PBCH antenna ports. As seen in FIG. 1, PRS pattern 120 in the resource block 110, or PRS pattern 150 in resource block 140 provide for the signaling of PRS information to UEs.

Figure 2:
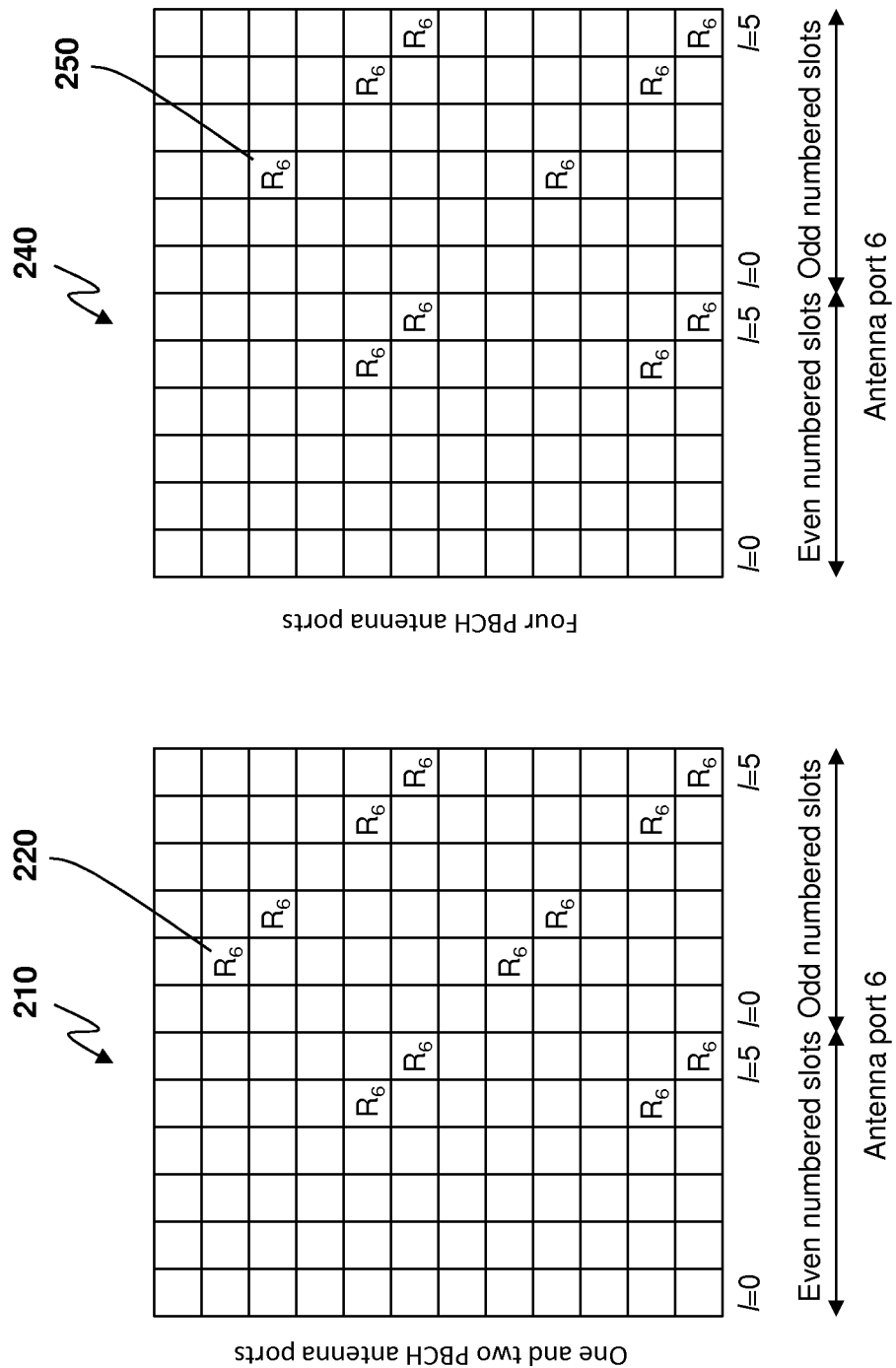
FIG. 2 is a block diagram showing resource blocks for one, two and four PBCH antenna ports with extended cyclic prefix and providing a mapping of positioning reference signals

Similarly, referring to FIG. 2, the figure shows resource block 210 having an extended cyclic prefix and one or two PBCH antenna ports and resource block 240 having an extended cyclic prefix and four PBCH antenna ports. Resource block 210 has PRS pattern 220 and resource block 240 has PRS pattern 250.

In the examples of FIGS. 1 and 2 above, overlap between PRS patterns in neighboring cells can be avoided by means of cell-specific frequency shifts of a number of subcarriers given by a physical cell identifier (PCI) with modulo 6, allowing six different non-overlapping frequency shifts. The PRS sequence is constructed in the same way as the cell-specific reference signals. The PRSs are designed to provide more reference signal energy and larger reuse factors than is available with the Release-8 cell-specific reference signals.

Other techniques for positioning include cell identifier based positioning which mainly uses geographical knowledge of the mobile's serving cell and measurements from the UE and the network, such as the cell site.

Basic cell ID positioning may use a location estimate of a UE as the coordinates of the serving cell, which is typically achieved by paging or tracking area updates, thereby providing a coarse estimation of mobile location.

Further, the coarse estimation may be enhanced using round trip time and UE received level measurements. Specifically, the distance of a UE from the serving cell site may be estimated from the round trip time (RTT). A UE reports the received transmit time difference to the serving cell and the serving cell site calculates its own receive-transmit time difference.

The RTT, also referred to as a type 1 measurement, is calculated in accordance with equation 1 below.

$$T_{ADV,1}=(R_x-T_x \text{ time difference from network})+(R_x-T_x \text{ time difference from mobile}) \quad (1)$$

As identified in equation 1, the round trip time is the difference between the receive and transmit time from the network plus the difference between the receive and transmit time from the mobile device.

The accuracy of the type 1 measurement above is limited on an order of approximately 0.3 μs, which translates to about a 45 m range.

A type 2 measurement may also be calculated in a radio frame containing a physical random access channel (PRACH) transmission from a UE, as outlined in equation 2 below.

$$T_{ADV,2}=(R_x-T_x \text{ time difference from network}) \quad (2)$$

The distance between the UE and the serving network is given by equation 3 below.

$$d=c\cdot RTT/2 \quad (3)$$

In equation 3 above, c is the speed of light.

Figure 3:
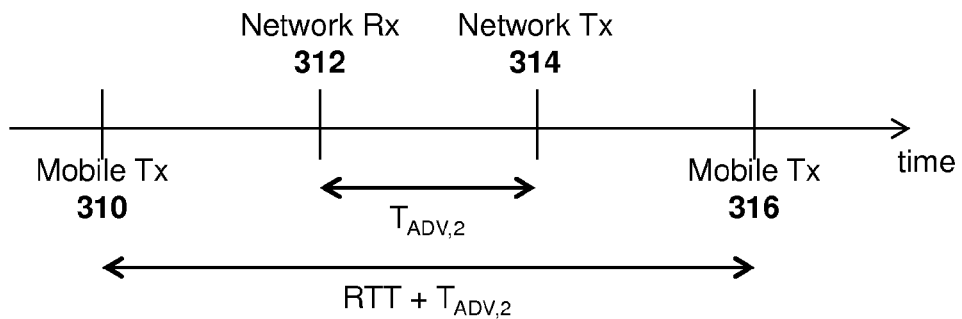
FIG. 3 is a chart showing round trip time estimation with timing advance.

Reference is now made to FIG. 3, which illustrates the above equations. In the example of FIG. 3, a user equipment transmits at mobile transmit time 310 and the transmission is then received by a network at time 312.

The network then transmits at time 314 and the user equipment receives the transmission at time 316. The round trip time is the time difference between time 310 and time 316, minus $T_{ADV,2}$, which is the time difference between times 312 and 314.

While the enhanced CID positioning above provides the distance from the UE to the base station, this only provides the radius from the base station and thus the UE can be in a variety of positions since the RTT does not provide directional information for the location of the UE.

In order to enhance the CID positioning, an Angle of Arrival (AoA) may be used to estimate the angle of the UE with respect to a reference direction, defined as a geographical north with counterclockwise directionality. The networks or cell sites, in general, estimate the AoA from an uplink transmission signal from the UE.

When estimating the AoA, antenna configuration may be a key factor. For example, with a linear array of equally spaced antenna configuration, the received signals of any two adjacent antennas are phase-rotated by a fixed amount value, called θ. Then, the value of θ is the function of AoA, antenna spacing and carrier frequency. Furthermore, sounding reference signal (SRS) or demodulation reference signal (DM-RS) can be used to estimate the AoA.

These or other location techniques can be used to find the location of the UE for proximity detection for D2D services. The present disclosure is not limited by any particular location estimation or calculation technique.

Proximity Discovery

As discussed above, a feasibility study on the Proximity-based Services (FS_ProSe, TR 22.803, "Technical Specification Group Services and System Aspects; Feasibility study for Proximity Services (ProSe)," Release 12, December, 2012) has identified various services which may be provided by the 3GPP system based on UEs being in proximity with each other.

However, as provided above, issues such as uplink and downlink interference, as well as signalling overhead and large search spaces for target UEs at an anchor UE, exist for proximity detection.

Therefore, in accordance with the present disclosure, several approaches are provided to create candidate sets of target UE for D2D communications, and for the signaling used for D2D proximity discovery. The embodiments provide for a UE to discover the proximity of other UEs in an efficient manner. Specifically, a proximity discovery approach is provided herein which allows UEs to connect to each other under existing cellular networks, and especially in network-assisted environments.

Factors such as the distance between the UEs, the arrival time of the transmitted signals under existing cellular systems, or power levels may be used.

In one embodiment, the location calculations described above may be utilized in proximity detection calculations. However, in other embodiments, the anchor UE itself can also estimate the distance and detect the received signal power from target UEs.

The transmitted signal for proximity discovery from the UEs may be either uplink signals or resources with single carrier frequency division multiple access (SC-FDMA) or orthogonal frequency division multiple access (OFDMA). Such signals may be those used in current LTE systems, or may include new signals or dedicated signals for proximity discovery. In other embodiments downlink signals or resources with OFDMA may be utilized. If uplink signals are used for proximity discovery, periodic signals, such as a sounding reference signal (SRS), reference signals on physical uplink control channels (PUCCH), and aperiodic signals, such as a demodulation reference signals (DM-RS), random access channel, dedicated random access channel, among others may be potential candidate signals for proximity discovery. Other existing or new downlink signals could also potentially be used.

Figure 4:
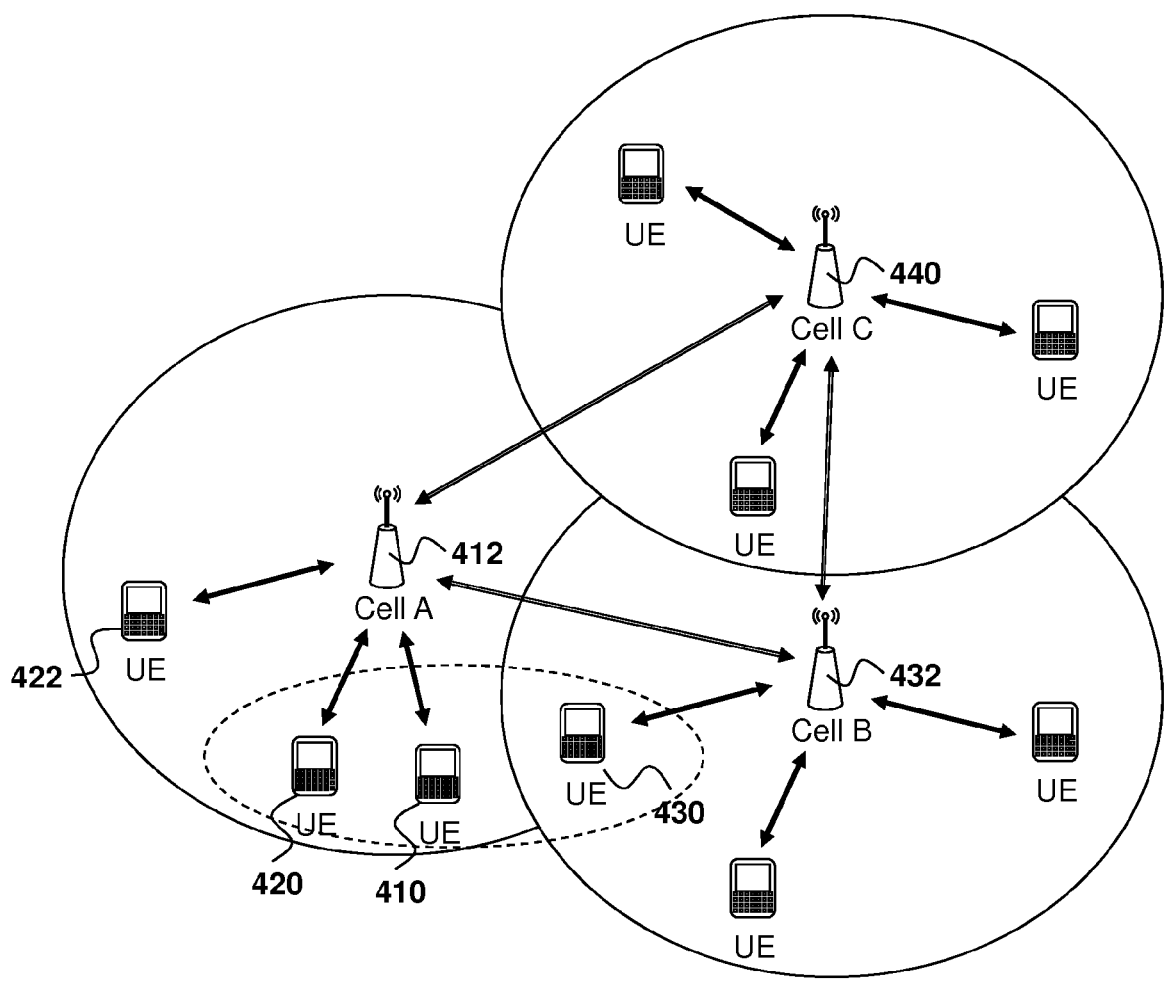
FIG. 4 is a block diagram showing cell deployments for D2D proximity discovery.

Reference is now made to FIG. 4, which shows cell deployments for D2D proximity discovery or communications. In the embodiment of FIG. 4, a UE 410 is served by a serving eNB 412. Similarly, UEs 420 and 422 are served by serving eNB 412.

A UE 430 is served by eNB 432 and other eNBs may be served by eNB 440.

In the example of FIG. 4, if UE 410 wants to discover and establish a connection to neighboring UEs in the intra and inter-cell coverage, including UEs 420 and 430, then UE 410 may send a message to request proximity discovery to serving eNB 412.

Serving eNB 412 may or may not allow a proximity discovery service a process to be started by UE 410. However, if the process is allowed, the serving eNB 412 may send signaling to trigger the proximity discovery procedure. Such signaling may include radio resource control (RRC) messages or medium access control (MAC) control elements (CE) to trigger the proximity discovery procedures.

In a further embodiment, if the serving eNB 412 can recognize the capabilities of UE 410 to support proximity discovery, the serving eNB 412 may send a message to UE 410 in order to trigger the proximity discovery procedures in UE 410. In this case, UE 410 may have previously sent its capabilities to the network to indicate that the UE 410 is capable of performing proximity discovery procedures. Such communication may, for example, use a UE capability indication message.

Figure 5:
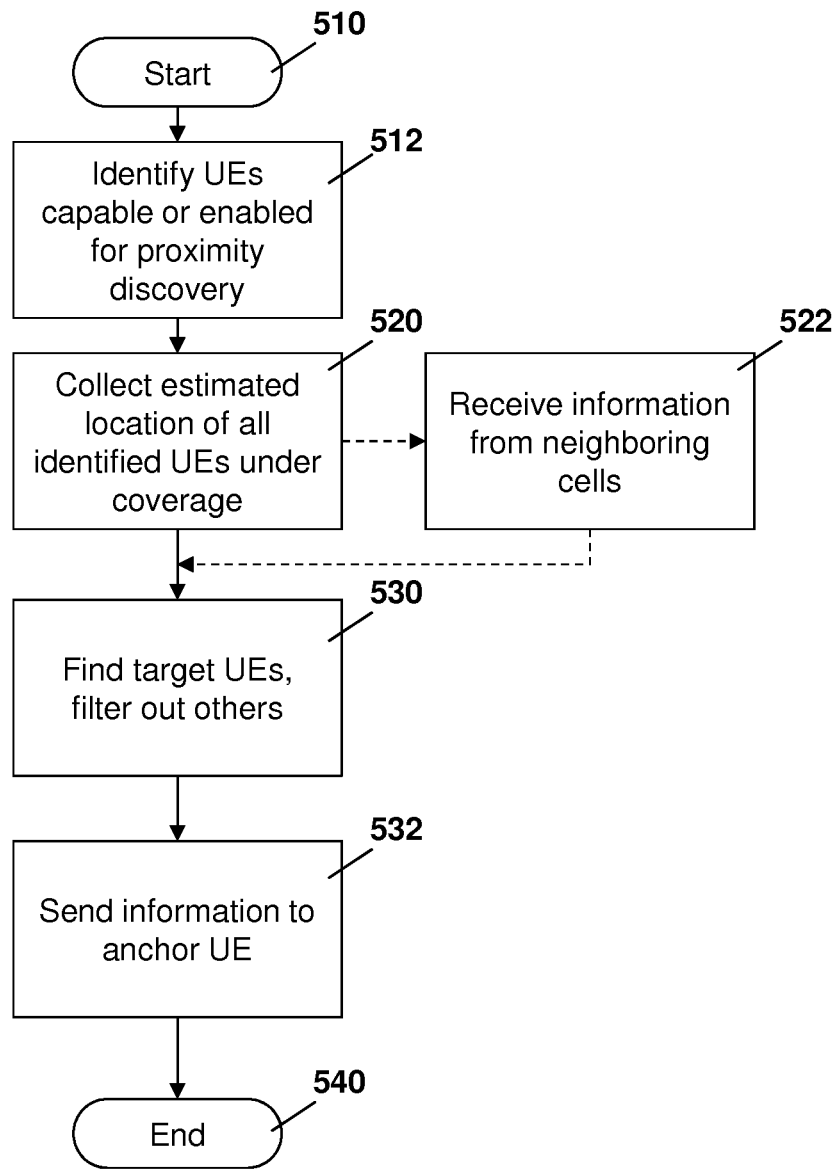
FIG. 5 is a flow diagram showing a simplified process for facilitating proximity discovery in accordance with one embodiment of the present disclosure.

The embodiments described herein are summarized with regards to FIG. 5, which shows an example process at an eNB.

The process of FIG. 5 starts at block 510 in which a determination is made at an eNB that a proximity discovery is required for an anchor UE. The process may be initiated either at the eNB or may be initiated through the receipt of a message from an anchor UE requesting proximity discovery.

The process next proceeds to block 512 in which the eNB identifies UEs with capabilities for D2D proximity discovery and enabled for D2D proximity discovery. From block 512 the process proceeds to block 520 in which the eNB collects the estimated location of the identified UEs under the eNBs coverage that want D2D services or D2D proximity discovery.

From block 520 the process proceeds optionally to block 522 in which information is received from neighboring eNBs about UEs in their area. For example, if the anchor UE is near the cell boundary of its serving eNB, then proximity detection may be applicable to UEs being served by a neighboring eNB and the information about such UEs may be received from the neighboring UE at block 522.

From block 522 the process proceeds to block 530. Optionally, the process may proceed directly from block 520 to block 530 if no information is required from target UEs served by a neighboring cell.

At block 530, the serving eNB can determine the UEs in close proximity for the anchor UE based on the distance from the anchor UE, a power level of the target UE or an estimated signal arrival time of proximity discovery signals from the target UE to the anchor UE, among other factors. In the process of block 530 the serving eNB adopts the approaches described below to filter out unnecessary UEs.

From block 530 the process proceeds to block 532 in which the information about target UEs is sent to the anchor UE. Such information may include, but is not limited to, UE identity and signal information for proximity discovery. Various signaling options are provided below.

From the example process of FIG. 5, signaling overhead between a radio access network and a UE may be reduced for discovery of target UEs by limiting the size of the search base or candidate set of target UEs. In one embodiment, the process of FIG. 5 may also assume that UEs may listen to and detect or demodulate signals from other UEs that use either uplink resources or downlink resources.

The specific blocks of FIG. 5 are described in more detail below.

Candidates Sets for D2D Discovery Search Space

FIG. 5, blocks 520 and 530, describe the collection of an estimated location of all UEs under its coverage that want D2D proximity discovery and the finding of target UEs and filtering out of other candidates. In one embodiment, two aspects are considered for all potential UEs. The aspects are the arrival time to the anchor UE, described with regard to equation 4 below, and the distance or possibly power level from the UE as described in equation 5 below. However, in other embodiments one of these equations may be considered to the exclusion of the other.

With regard to arrival time, a reference transmission time instance from different UEs may be different. Thus, proximity signals may arrive at the anchor UEs in different time instants, thereby causing inter-UE interference.

Further, anchor UEs may not know information about other UEs including their identity and the discovery signals for proximity discovery. In accordance with one embodiment, the eNB may provide such information to the anchor UE in an efficient manner.

To select devices in proximity, the eNB first defines a candidate set for each search space. The candidate set may consist of target UEs whose proximity signals can be detected by the anchor UE and are calculated by the serving eNB.

A candidate set $C_m^{Tier\ l}$ of the anchor UE m at the l-th tier is defined as all UE k that meet the criteria of equations 4 and 5 below.

$$|t_m^{(A)} - t_k^{(B)} - t_{k \to m}^{prop} - t_D^{(A,B)}| < T_{diff,Th}^{Tier\ l} \quad (4)$$

$$d_{k \to m}^{(A,B)} < D_{Th}^{Tier\ l} \quad (5)$$

In equation 4 above, $t_m^{(A)}$ is the time adjustment of UE m in the cell site A on the physical resource access channel (PRACH) or a timing advanced value of $T_A$ when the UE m is placed in a cell B. The term $t_{k \to m}^{prop}$ is the propagation delay from UE k to UE m. The term $t_D^{(A,B)}$ is the synchronization time difference between cell site A and B. The term $T_{diff,Th}^{Tier\ l}$ is the maximum allowable time difference for proximity discovery for the l-th tier.

In equation 5 above, $d_{k \to m}^{(A,B)}$ is the distance from the UE m in cell site A and UE k in cell site B, where B=1, 2, ..., N and N is the total number of neighboring cell sites including cell site A. The term $D_{Th}^{Tier\ l}$ is the maximum allowable distance for proximity discovery at the l-th tier.

Thus, based on equation 4 timing advance or time of flight for a signal may be used as criteria to determine candidates within a tier, and/or equation 5 (distance criteria) can be used.

Figure 6:
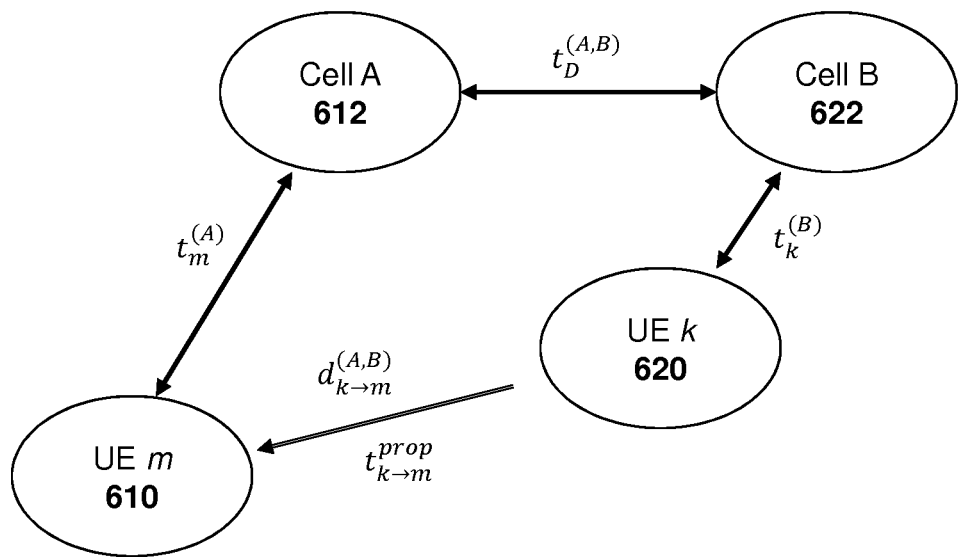
FIG. 6 is a plot of arrival time and distance set up of the l-th Tier for proximity discovery from an anchor UE.

The above may further be displayed with regard to FIG. 6. As seen in FIG. 6, an anchor UE, designated as UE m, is shown with reference numerals 610. UE 610 is served by cell 612 and $t_m^{(A)}$ is calculated from downlink or uplink signals between UE 610 and cells 612.

Similarly, UE 620, designated as UE k, is served by cell 620 and $T_k^{(B)}$ is calculated from downlink or uplink signals from UE 620 to cell 622.

The delay between cell 612 and cell 622, $t_D^{(A,B)}$ is calculated from X2 signaling between cell 612 and cell 622.

The terms $d_{k \to m}^{(A,B)}$ and $d_{k \to m}^{prop}$ are calculated from downlink or uplink signals from cell 622.

Thus, in accordance with the above, a candidate set for a particular tier may be created based on the thresholds of the tier. The tier may be adapted to separately detect target UEs depending on their arrival time at the anchor UE.

Further, if cell A 612 and cell B 622 are the same cell then the proximity discovery process is for intra-cell proximity discovery and otherwise if the two are different then the discovery process is for inter-cell proximity discovery.

The values of $T_{diff,Th}^{Tier\ l}$ and $D_{Th}^{Tier\ l}$ are configured by networks, carriers or other service providers and may be provided to the UEs when initiating D2D proximity discovery.

The actual determination of a candidate set may be made in accordance with the solutions below.

Distance Only

In one embodiment, the estimated geographical location of the UEs may be known to networks, such as cell sites, and networks can provide not only which signals are exploited for proximity discovery but also the corresponding information to detect the signals transmitted from target UEs at the anchor UE. Thus, the candidates set may be determined only using equation 5 on the eNB side.

In this case, as the configuration parameter, the distance threshold value $D_{Th}^{Tier\ l}$ may be signaled from the networks to an anchor UE with corresponding information as described below. Alternatively, the distance threshold may be chosen or suggested by the UE.

Arrival Time Only

In an alternative embodiment, as uplink signals arrive in approximate synchronization at the serving cell site (based on timing advance), the arrival time to the anchor UE can vary, thereby causing inter-user interference. Tiers may be defined depending on the arrival time to the anchor UE, meaning that the UE will discover UEs at a first tier depending on the arrival time and repeat the next tier depending on the configuration if set for multiple tiers. If the composite target signals are received at the same time from several UEs, then the strongest received signal is first detected and the process next proceeds to the second strongest signal, and so on. Such determination is similar to the successive signal detection. In this case, the candidate set is determined only using equation 4 above.

Determination Based on Both Arrival Time and Distance Constraints

A further alternative embodiment, a hybrid approach to the above two approaches can be provided in which the tier may be created based on a combination of distance as well as arrival times. Thus, for a given tier, the candidate set will need to meet the criteria of both equations 4 and 5 above.

Received Power

In a further embodiment, the estimated geographical location of UEs is known to networks, such as cell sites. The networks can provide information to an anchor UE of not only which signals are exploited for proximity discovery, but also the corresponding information used to detect the signals transmitted from the target UEs. In this case, the minimum allowable power may be signaled from the networks to the anchor UE with the other corresponding information. Alternatively, a maximum allowable distance can be provided by the UE to the networks.

Once the minimum allowable power or maximum allowable distance are known, then the network may send the corresponding information about target UEs to the anchor UEs through higher level signaling.

In one embodiment, as the anchor UE may not know information for the target UE with a strong power level, the anchor UE may need to calculate possible combinations of signal information exhaustively to find candidates and the detected signal information may be fed to the eNB. Then the eNB can send the information of the detected UEs to the anchor UE, Arrival Time and Received Power In a further embodiment, a hybrid is provided which utilizes the solution of equation 4 with the received power constraint described above. In this case, a concept of a tier can be applied based on both received power level as well as the arrival time.

Intra-Cell Configuration

In one simplification of the embodiments described above, D2D communications under intra-cell configuration has A=B. In this case, $t_D^{(A,B)}=0$.

Figure 7:
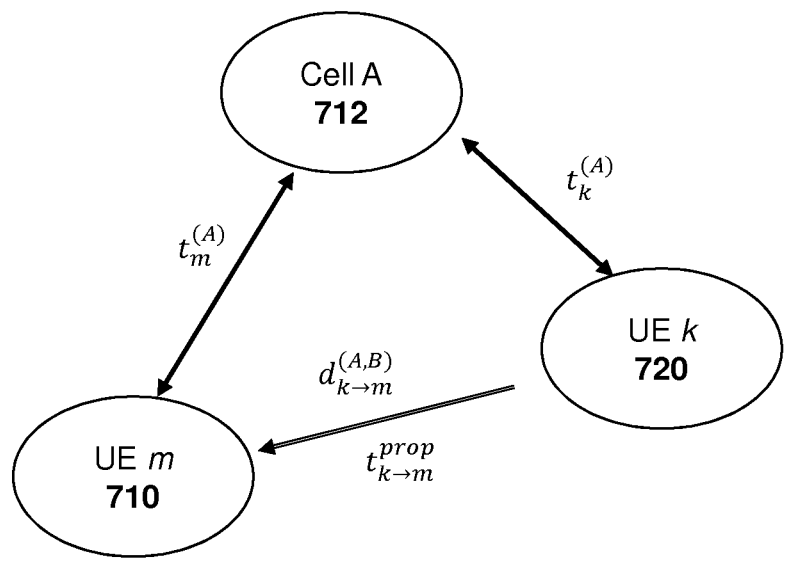
FIG. 7 is the plot of FIG. 6 where the proximity discovery is in an intra-cell case.

Reference is now made to FIG. 7, which shows one example of the arrival time and distance set-up for proximity discovery between UE 710 and UE 720 where both are served by an eNB 712. In this case, equations 4 and 5 above may be simplified, as shown in equations 6 and 7 below.

$$|t_m^{(A)} - t_k^{(A)} - t_{k \to m}^{prop}| < T_{diff,Th}^{Tier\ l} \quad (6)$$

$$d_{k \to m}^{(A,A)} < D_{Th}^{Tier\ l} \quad (7)$$

Based on the various embodiments described above, a candidate set may be defined for a particular tier based on equations 4 and/or 5 above, and may include power levels.

Signaling

Once the eNB has calculated the candidate set for the particular tier, referring back to FIG. 5 the process from block 530 to block 532. For block 532 the information is sent to the anchor UE. Various signaling is provided for both of the initiation of the proximity discovery and the providing of the information to the anchor UE.

The proximity discovery for D2D communications may be initiated by either networks or UEs which have D2D communication capabilities. In both cases, the configured parameters of $T_{diff,Th}^{Tier\ l}$ and $D_{Th}^{Tier\ l}$ may be exchanged between the networks and the UEs. Further, in some embodiments, the proposed signaling approaches below are not limited to those solutions described above and could be used with other solutions for calculating candidate UEs.

Intra-Cell Case

Figure 8:
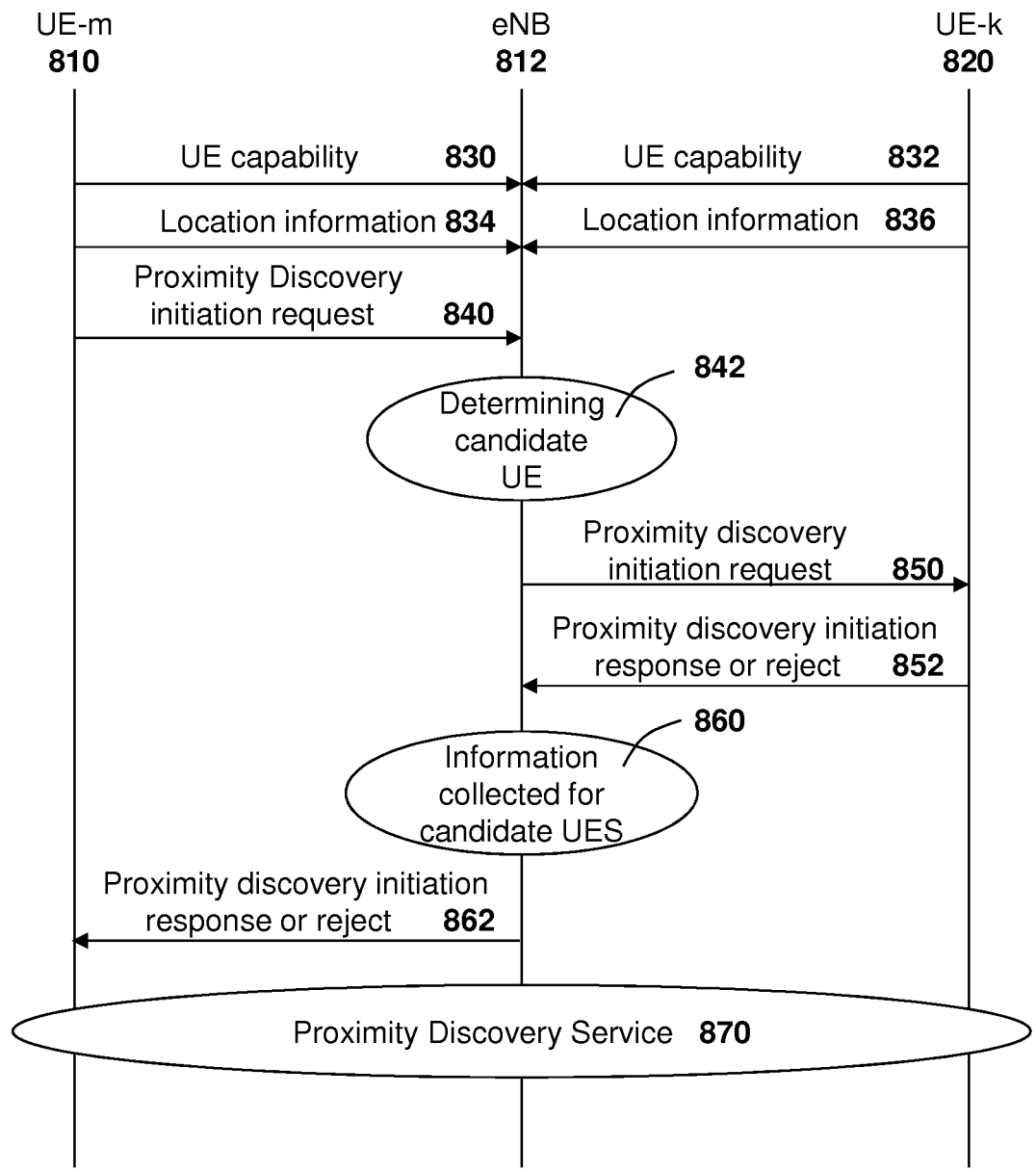
FIG. 8 is a flow diagram showing signaling flow for UE initiated proximity discovery in an intra-cell case.

In a first embodiment for intra-cell signaling, the UE may initiate proximity discovery. Reference is now made to FIG. 8, which shows an anchor UE 810 communicating with a serving eNB 812. In the example of FIG. 8 a target UE 820 also communicates with serving eNB 812.

UE 810 first sends a message 830, including its capability to support proximity discovery, to eNB 812. Similarly, UE 820 sends a message 832 to eNB 812 providing its capabilities. In one embodiment, messages 830 and 832 may use existing RRC uplink messages with a new information element including a request for proximity discovery. In other embodiments a new RRC uplink message may be defined for the proximity request and may for example be a UE capability indication message.

For example, a UE CapbililityInformation message may be provided in 3GPP TS 36.331 "*Evolved Universal Terrestrial Radio Access (E-UTRA); Radio Resource Control (RRC); Protocol specification (Release 11)*". The addition to the above specification may, for example provide a message as defined in Table 1 below.

TABLE 1

UECapabilityInformation message

```
-- ASN1START
UECapabilityInformation ::=            SEQUENCE {
    rrc-TransactionIdentifier              RRC-TransactionIdentifier,
    criticalExtensions                     CHOICE {
        c1                                     CHOICE{
            ueCapabilityInformation-r8             UECapabilityInformation-r8-IEs,
            ueCapabilityInformation-r12    UECapabilityInformation-r8-IEs
            spare7 NULL,
            spare6 NULL, spare5 NULL, spare4 NULL,
            spare3 NULL, spare2 NULL, spare1 NULL
        },
        criticalExtensionsFuture               SEQUENCE { }
    }
}
UECapabilityInformation-r8-IEs ::=      SEQUENCE {
    ue-CapabilityRAT-ContainerList         UE-CapabilityRAT-ContainerList,
    nonCriticalExtension                   UECapabilityInformation-v8a0-IEs
        OPTIONAL
}
UECapabilityInformation-r12-IEs ::= SEQUENCE {
    ue-CapabilityProximityService          UE-CapabilityProximityService,
    nonCriticalExtension           UECapabilityInformation-v12a0-IEs
        OPTIONAL
UECapabilityInformation-v8a0-IEs ::= SEQUENCE {
    lateNonCriticalExtension               OCTET STRING
        OPTIONAL,
    nonCriticalExtension                   SEQUENCE { }
        OPTIONAL
}
-- ASN1STOP
```

Information similar to that provided in the message of Table 1 may be also be provided in a UEInformationResponse message; a RRCConnectionRequest message; a RRCConnectionReconfigurationComplete message; a RRCConnectionReestablishmentRequest message, or a MeasurementReport message, among others.

Referring back to FIG. 8, UEs 810 and 820 also send location information to the eNB, as shown by messages 834 and 836. In some embodiments the messages at 834 and 836 may be sent concurrently with the capability information sent at messages 830 and 832.

In the example of FIG. 8, UE 812 initiates the proximity discovery request and sends and proximity discovery initiation request message 840 to eNB 812 through one of various techniques. Such message may be sent via RRC message which may be a modified existing RRC message or a new RRC message, or may be a new MAC control element or a reserved field in a MAC control element.

For example, one RRC message used for the proximity discovery initiation request message 840 may be a 3GPP TS 36.331 RRCConnectionRequest message, as shown in Table 2 below.

TABLE 2

RRCConnectionRequest message

```
-- ASN1START
RRCConnectionRequest ::=                SEQUENCE {
    criticalExtensions                      CHOICE {
        rrcConnectionRequest-r8                 RRCConnectionRequest-r8-
                                                    IEs,
        ProximityServiceRequest-r12         ProximityServiceRequest-r12-IEs,
        criticalExtensionsFuture                SEQUENCE { }
    }
}
```

TABLE 2-continued

RRCConnectionRequest message

```
RRCConnectionRequest-r8-IEs ::=     SEQUENCE {
    ue-Identity                             InitialUE-Identity,
    establishmentCause                      EstablishmentCause,
    spare                                   BIT STRING (SIZE (1))
}
ProximityServiceRequest-r12-IEs ::=  SEQUENCE {
    ue-Identity                             InitialUE-Identity,
    LocationInformation                     LocationCause,
    spare                                   BIT STRING (SIZE (1))
}
InitialUE-Identity ::=      CHOICE {
    s-TMSI                                  S-TMSI,
    randomValue                             BIT STRING (SIZE (40))
}
```

TABLE 2-continued

RRCConnectionRequest message

```
EstablishmentCause ::=      ENUMERATED {
                            emergency, high PriorityAccess,
                            mt-Access,
mo-Signalling,
                            mo-Data, delayTolerantAccess-
                            v1020,
spare2, spare1}
-- ASN1STOP
```

Similar logic and modifications may also be made in UEInformationResponse message; RRCConnectionRequest message; RRCConnectionReconfigurationComplete message; RRCConnectionReestablishmentRequest message; or a MeasurementReport message, among others.

When the eNB 812 receives the proximity discovery initiation request message 840 from UE 812, the eNB starts to look up information and determine a candidate UE or UEs that satisfy one of the embodiments described above in its cell. For example, such candidates that may be determined based on arrival time, distance, or power. The determining of the candidate UE set is shown by block 842 in the embodiment of FIG. 8.

The eNB may then send a proximity discovery initiation request message to various candidate UEs, including UE 820. Such a message is sent to UEs which satisfy the constraints described above in order to satisfy the approval of the UEs for proximity discovery initiation. The proximity discovery initiation request is shown with message 850 in the embodiment of FIG. 8.

When UE 820 receives the proximity discovery initiation request message 850 from the eNB, if the UE allows the proximity discovery request then the UE may send a proximity discovery initiation response message 852 back to eNB 812. The proximity discovery initiation response message may include information about the UE to allow eNB 812 to create the candidate set. For example, if an SRS channel is used for proximity discovery, not only identity information but also channel related information such as SRS bandwidth, subframe configurations, frequency position, frequency hopping size, SRS duration, comb offset, cyclic shift, periodicity, and subframe offset are transmitted to the eNB in message 852. However, such information is only exemplary and other information or different information may be provided in message 852.

If the UE 820 does not allow proximity discovery then the UE may send a proximity discovery initiation reject message in message 852 to the serving eNB 812.

When eNB 812 receives the proximity discovery initiation response message 852, the eNB may then look up and collect information for proximity discovery requested by UE 810. In this regard, a candidate tier may be established, shown by block 860 in the embodiment of FIG. 8.

The eNB 812 may then send a proximity discovery initiation response to UE 810. The response, shown with message 862, may provide information about the target UE. For example, if an SRS channel is used for proximity discovery, identity information and channel related information such as SRS bandwidth, subframe configuration, frequency position, frequency hopping size, SRS duration, comb effect, cyclic shift, periodicity and subframe offset may be included in the information provided in message 862 to UE 810.

In other embodiments, if the same information is stored and available at the eNB 812, eNB 812 may send the information to UE 810 without receiving such information from UE 820 in message 852.

If the eNB 812 receives a proximity discovery initiation rejection message from eNB 820 then the UE may send a proximity discovery initiation reject message to UE 810 as shown by message 862.

Once the UE 810 has the information about the candidate UEs, it may initiate a proximity discovery service as shown by block 870 in the example of FIG. 8.

eNB Initiated Intra-Cell Proximity Discovery

Figure 9:
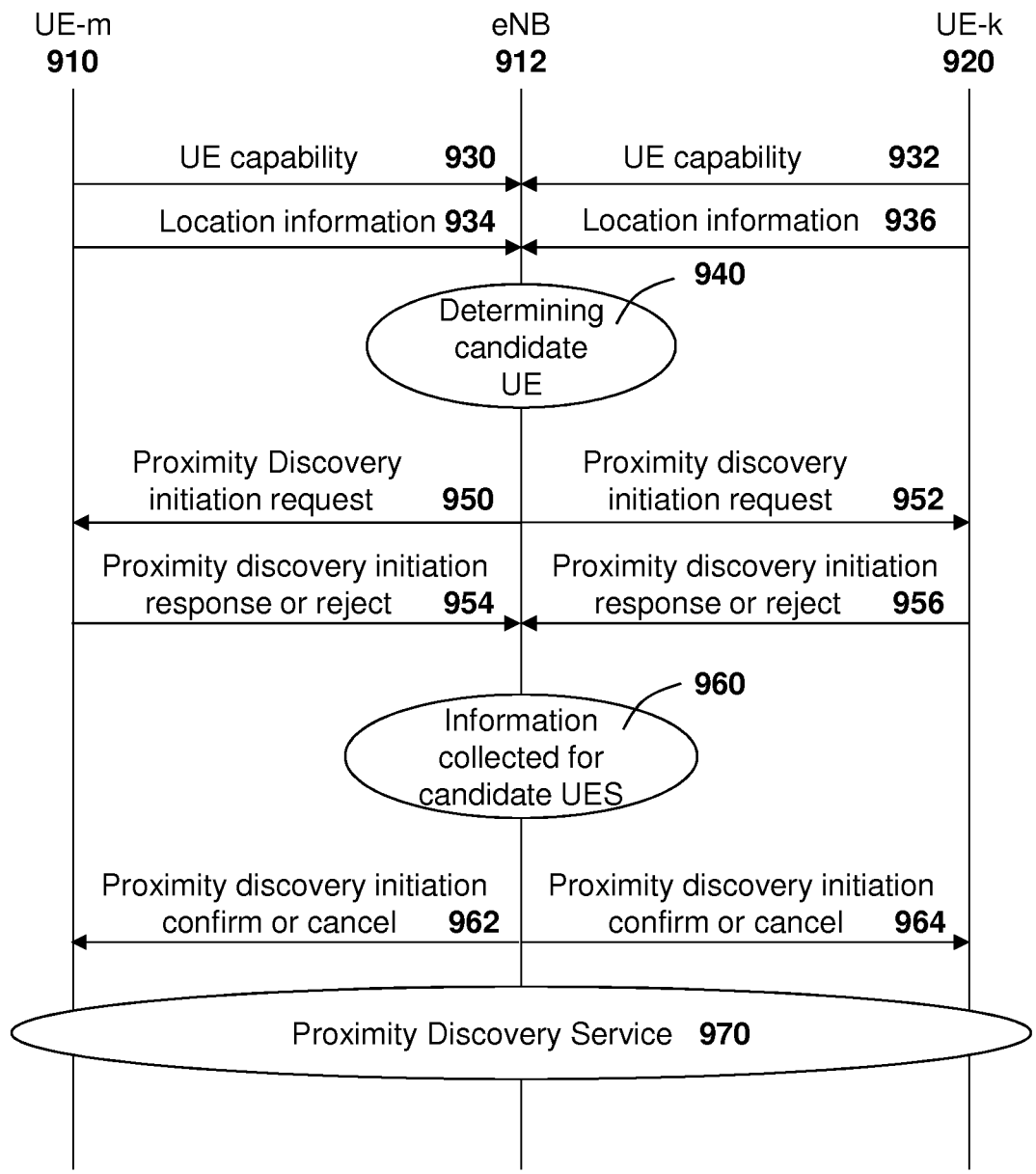
FIG. 9 is a flow diagram showing signaling flow for eNB initiated proximity discovery in an intra-cell case.

In the embodiment of FIG. 9, an eNB initiates proximity discovery. In particular, as seen in FIG. 9, a UE 910 communicates with the serving eNB 912. Further, a UE 920 also communicates with eNB 912.

As with messages 830 and 832, UEs 910 and 920 provide their capability information to eNB 912 as shown by messages 930 and 932. Further, UEs 910 and 920 provide their location information as shown by messages 934 and 936 in the embodiment of FIG. 9.

When the eNB 912 wants to initiate proximity discovery among or between UEs located in its cell, the eNB 912 sends a proximity discovery initiation request message to candidate UEs to get approval from the UEs for the proximity discovery. In particular, as seen in FIG. 9, the eNB determines a list of candidate UEs as shown by block 940 and then sends the proximity discovery initiation request to UE 910 using message 950, and to UE 920 using message 952.

The UEs 910 and 920 receive the proximity discovery initiation request messages 950 and 952 respectively, and if the UE allows proximity discovery requests, the UE may send a proximity discovery initiation response message with information back to eNB 912. Otherwise the UE sends a reject messages. Example response or reject messages are shown as messages 954 and 956.

If the UE allows the proximity discovery request, the information provided in the response may include, but is not limited to, identity information as well as channel related information. For example, if an SRS channel is used for proximity discovery, such channel information may include SRS bandwidth, subframe configuration, frequency position, frequency hopping size, SRS duration, comb offset, cyclic shift, periodicity, and subframe offset.

Conversely, if the UE does not allow the proximity discovery request then a rejection message is sent as shown by messages 954 and 956 in the embodiment of FIG. 9.

Once the eNB receives the proximity discovery response with the information, the eNB looks up and collects information for proximity discovery to respond to the UEs under the eNB. For example, if SRS channel information is used for proximity discovery, the information provided back to the UE may include identity information but may also include channel related information such as SRS bandwidth, subframe configuration, frequency position, frequency hopping size, SRS duration, comb offset, cyclic shift, periodicity, and subframe offset.

Based on such information collected for the candidate UEs, as shown by block 960, a proximity discovery initiation confirm or cancel message 962 and 964 may be sent back to UEs 910 and 920. The eNB proximity discovery initiate confirm message may include the information described above for both the channel and the UEs.

In an alternative embodiment, if the information for the UEs is already stored at the eNB, then the eNB may send information to the UEs without receiving information from the UEs.

When the eNB receives the proximity discovery initiation rejection message 954 or 956 from the candidate UE, the eNB may send a proximity discovery initiation cancel message to UEs 910 or 920. Further, if the eNB receives unpaired information, for example receiving a response from a single UE, the eNB may drop proximity discovery connection or re-initiate proximity discovery connections with another candidate UE.

Once the UEs 910 and 920 receive the proximity discovery initiation confirm messages 962 and 964, then proximity discovery service between the UEs may be initiated as shown by block 970.

Proximity Discovery for Inter-Cell Cases

Figure 10:
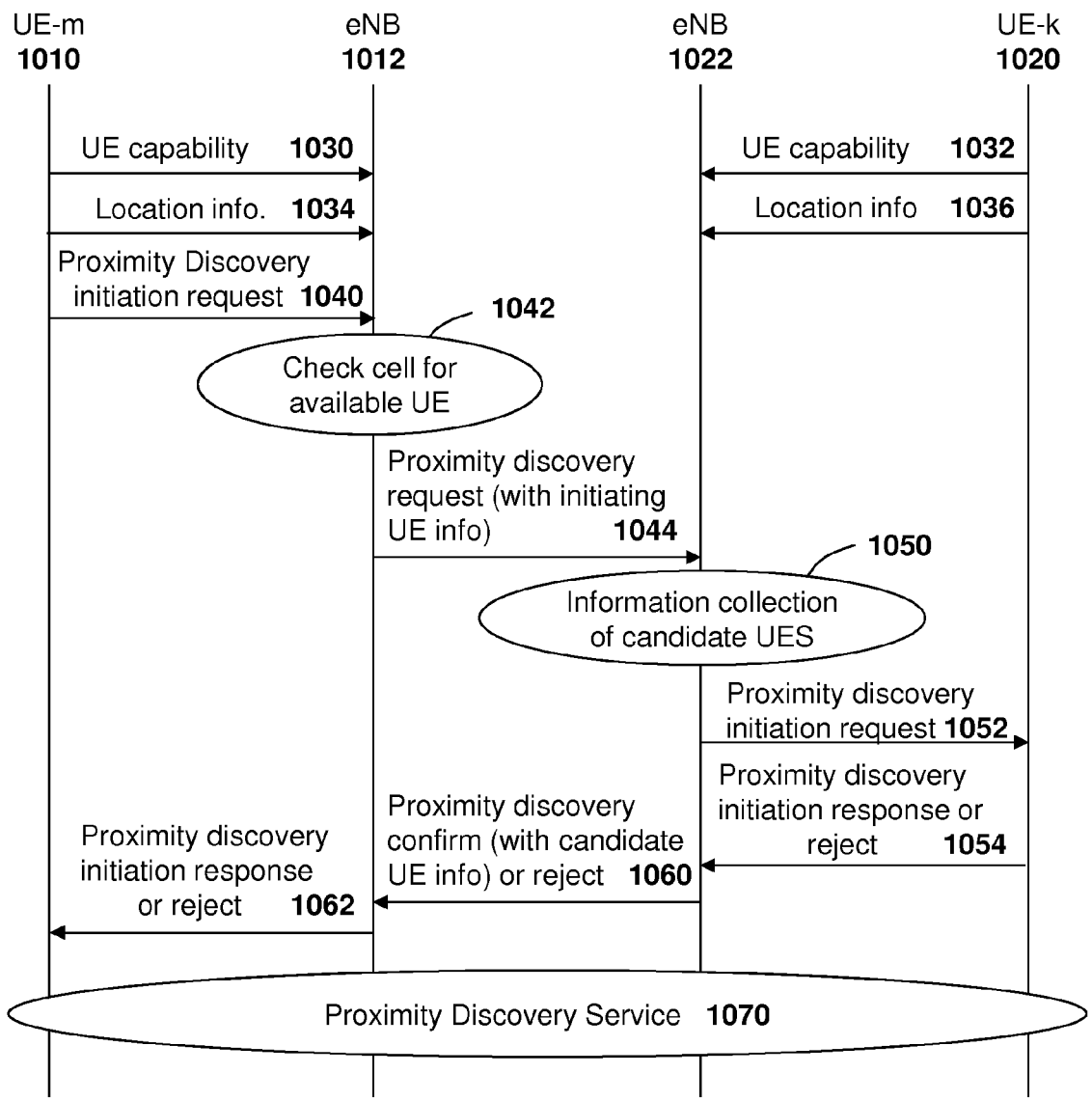
FIG. 10 is a flow diagram showing signaling flow for UE initiated proximity discovery in an inter-cell case.

In the case of an inter-cell discovery, the eNB may first check whether UEs located in its cell are available for D2D communications. If there are available UEs in its cell, the eNB may use intra-cell proximity discovery as described above with regard to FIGS. 8 and 9. However, if interested UEs are available in other cells, the eNB may provide for inter-cell proximity discovery with neighboring eNBs (for example, the anchor UE is located in the cell edge and the serving eNB may look for candidate UEs in neighboring cells). Reference is now made to FIG. 10.

In the example of FIG. 10, a message may be provided via RRC messaging, including a modified existing RRC message or a new RRC messages, or may be provided through a MAC control elements including new MAC control elements or using a reserve field in an existing MAC control element.

FIG. 10 shows an embodiment with UE initiated proximity discovery. In particular, a UE 1010 communicates with its serving eNB 1012. Further, a UE 1020 communicates with its serving eNB 1022.

As with the embodiments of FIGS. 8 and 9 above, UEs 1010 and 1020 provide their capability to their respective eNBs, as shown by messages 1030 and 1032.

Further, UEs 1010 and 1020 provide their location information to their respective serving eNBs, as shown with messages 1034 and 1036.

In the example of FIG. 10, UE 1010 initiates the proximity discovery by sending a proximity discovery initiation request shown by message 1040 to eNB 1012.

When the eNB 1012 receives the proximity discovery initiation request message 1040 from UE 1010, the eNB 1012 first checks whether there are UEs available in its cell, as shown by block 1042 and when it discovers that there are no available UEs in its cell, the eNB 1012 sends a proximity discovery request with information of the initiated UE to eNB 1022, as shown by message 1044. Information that is provided in message 1044 may include the location and the distance threshold $D_{Th}^{Tier\ i}$, or may include the received power level of the UE that initiated the proximity discovery.

When eNB 1022 receives the proximity discovery request, it collects information for a collection of candidate UEs, as shown by block 1050 and sends a proximity discovery initiation request message to a candidate UE 1020 that satisfies the threshold criteria described above with regard to equations 4 and 5 to get the approval of the UE for proximity discovery. Such a proximity discovery initiation request message is shown by message 1052 in the embodiment of FIG. 10.

In response to the proximity discovery initiation request message 1052, UE 1020 may either allow or reject the message. If the UE allows the message, the UE 1020 sends a proximity discovery initiation response message with information in it. The information may include information about the identity of the UE and may also include channel information. For example, if an SRS channel is used for proximity discovery, the channel related information may include the SRS bandwidth, subframe configuration, frequency position, frequency hopping size, SRS duration, comb effect, cyclic shift, periodicity, and subframe offset, among others. The information is provided in message 1054 back to eNB 1022.

Conversely, message 1054 may be a proximity discovery initiation reject message in which the UE rejects the proximity discovery. At that point, the eNB may look for other candidates.

When eNB 1022 receives message 1054, the eNB may transfer information within the message to eNB 1012. Such information may include, but is not limited to, channel related information such as SRS bandwidth, subframe configuration, frequency position, frequency hopping size, SRS duration, comb offset, cyclic shift, periodicity, and subframe offset.

In an alternative embodiment, if eNB 1022 already knows the information for UE 1020, and this information is stored on eNB 1022, then the messages 1052 and 1054 may be avoided and the information may be passed directly to eNB 1012 within message 1060.

When eNB 1012 receives message 1060, eNB 1012 may look up and collect information for proximity discovery requested by UE 1010. For example, eNB 1012 may send a proximity discovery initiation response message 1062 with identity information of the candidate UE along with channel information such as SRS bandwidth, subframe configuration, frequency position, frequency hopping size, SRS duration, comb offset, cyclic shift, periodicity and subframe offset, among other information.

In a further embodiment, if the eNB 1012 knows the information for UE 1020, it does not necessarily need to request such information in message 1044, nor receive a response at 1060, and may instead provide the information directly in message 1062 to UE 1010.

Alternatively, if there are no candidate UEs, the eNB 1012 may send a proximity discovery initiation reject at message 1062.

If a candidate UE is identified, then a proximity discovery service initiation may occur as shown at block 1070 in the embodiment of FIG. 10.

Figure 11:
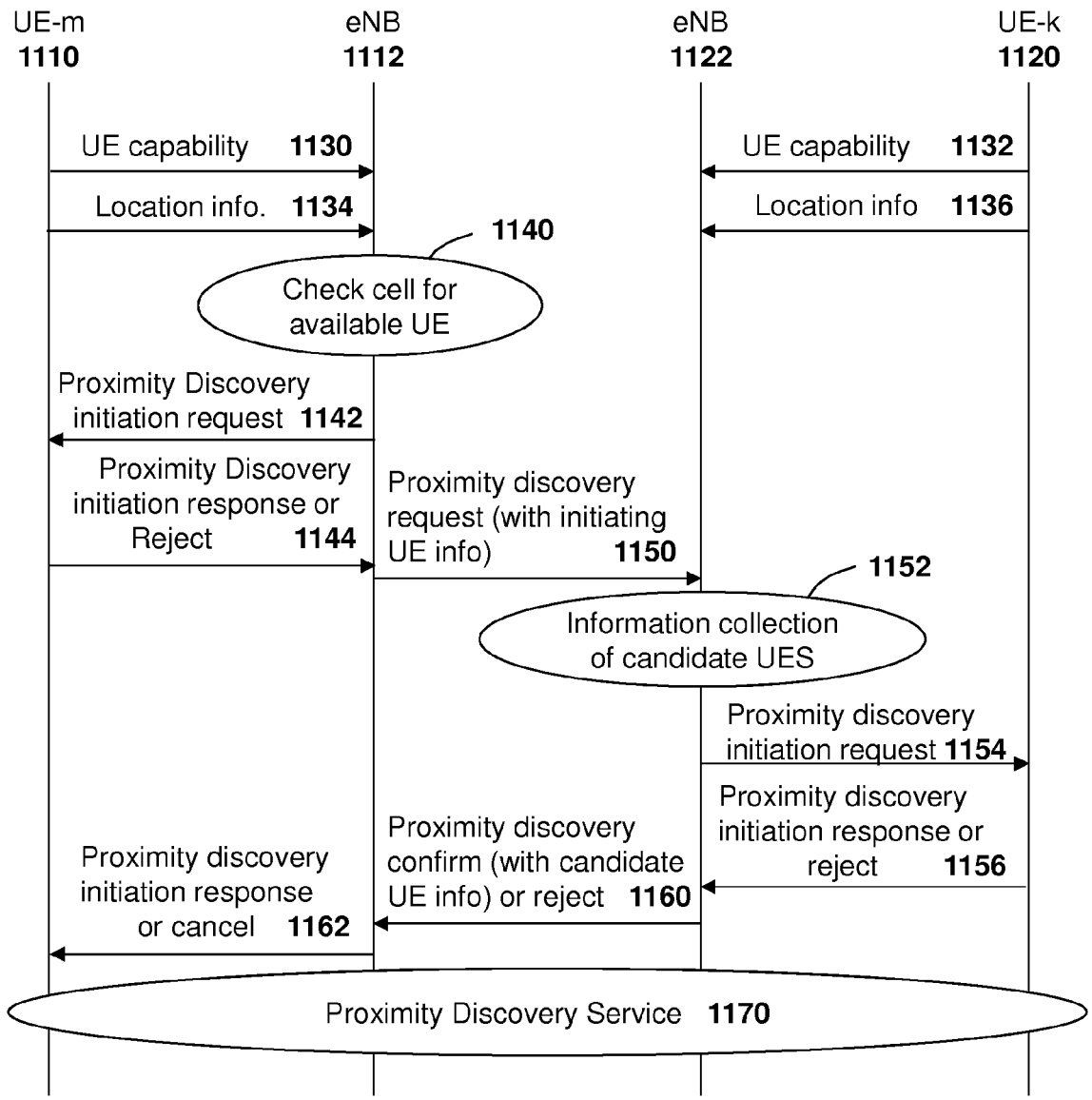
FIG. 11 is a flow diagram showing signaling flow for eNB initiated proximity discovery in an inter-cell case.

In a further embodiment, the eNB may initiate the proximity discovery. Reference is now made to FIG. 11 in which a UE 1110 communicates with an eNB 1112. Further, UE 1120 communicates with and is served by eNB 1122.

As with the embodiments of FIGS. 8, 9 and 10, UEs 1110 and 1120 provide their capability information to their serving UEs, as shown by messages 1130 and 1132. Further, UEs 1110 and 1120 provide their location information to their serving eNBs, as shown by messages 1134 and 1136.

In the example of FIG. 11, eNB 1112 checks within its cell to determine if there are available UEs, as shown by block 1140, when the eNB 1112 wants to initiate proximity discovery with UEs located in its neighboring cells.

If there are is only one candidate UEs in its cell, eNB 1112 sends a proximity discovery initiation request message 1142 to the candidate UE, namely UE 1110. When UE 1110 receives the proximity discovery initiation message from the eNB, if the UE allows proximity discovery requests, the UE sends the proximity discovery initiation response message 1144 with some information. This information may include identity information along with channel information. For example, if SRS channels are used then the proximity discovery response may include SRS bandwidth, subframe configuration, frequency position, frequency hopping size, SRS duration, comb offset, cyclic shift, periodicity or subframe offset.

Conversely, if UE 1110 does not allow the proximity discovery request, the UE may send a proximity discovery initiation reject message as message 1144.

Further, eNB 1112 sends a proximity discovery request message 1150 to a neighboring cell. The eNB 1112 may use an X2/S1 interface message to the send the proximity discovery request message. For example, an existing X2/S1 interface message with a new information element may be utilized for the request. Alternatively a new X2/S1 interface message for a proximity discovery request may be utilized.

When the eNB 1122 receives the proximity discovery request message 1150 from eNB 1112, eNB 1122 may identify candidate UEs, as shown in block 1152, which satisfy the various threshold equations above. The eNB 1122 may then send the candidate UEs a proximity discovery initiation request message 1154 in order to get the approval of the UE for discovery.

When UE 1120 receives the proximity discovery initiation request message, it may either provide a response or rejection message. If the UE allows the proximity discovery request, a response message 1156 may be sent with information including identity information and channel information. Such channel information may include, if an SRS channel is used for proximity discovery, SRS bandwidth, subframe configuration, frequency position, frequency hopping size, SRS duration, comb offset, cyclic shift, periodicity, and subframe offset among other options.

If the UE does not allow the proximity discovery request, the UE 1120 may send a proximity discovery initiation reject message 1156.

When eNB 1122 receives the proximity discovery initiation response message with information from candidate UE 1120, the eNB 1122 may transfer the information to eNB 1112 using a proximity discovery confirmation message 1160. Such message may include information including identity information and the channel information provided in message 1156. The response may be sent using existing X2/S1 interface messages with a new IE for proximity discovery configuration or may be sent with a new X2/S1 interface message for proximity discovery confirmation.

In an alternative embodiment, if eNB 1122 knows information for UE 1120, messages 1154 and 1156 may be unnecessary and eNB may provide the information in message 1160 from the stored information.

When eNB 1112 receives the proximity discovery confirmation message 1160, the eNB 1112 may look up and collect information for proximity discovery requested by the UE. The eNB 1112 may send a proximity discovery initiation response message 1162 with some of the information including identity information as well as channel information to UE 1110.

Further, in some embodiments, eNB 1112 may know information for UE 1120 already, and if this is the case then messages 1150 and 1160 may be unnecessary and the UE could provide message 1162 with information from its memory or cache.

Alternatively, if a rejection message is received at message 1160 then the eNB 1112 may send a proximity discovery cancel message at message 1162 to UE 1110.

If message 1162 is a proximity discovery initiation response then a UE 1110 may then initiate a proximity discovery service with UE 1120, as shown by block 1170.

Figure 12:
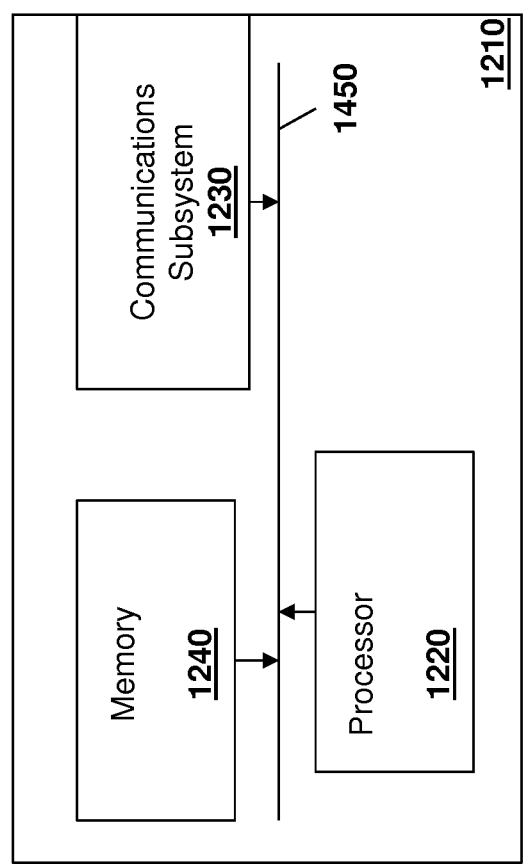
FIG. 12 is a simplified block diagram of an example network element.

The eNBs and network elements in the embodiments of FIGS. 1 to 11 above can be any network element, or part of any network element, including various network servers. Reference is now made to FIG. 12, which shows a generalized network element.

In FIG. 12, network element 1210 includes a processor 1220 and a communications subsystem 1230, where the processor 1220 and communications subsystem 120 cooperate to perform the methods of the embodiments described above.

Processor 1220 is configured to execute programmable logic, which may be stored, along with data, on network element 1210, and shown in the example of FIG. 12 as memory 1240. Memory 1240 can be any tangible storage medium.

Alternatively, or in addition to memory 1240, network element 1210 may access data or programmable logic from an external storage medium, for example through communications subsystem 1230.

Communications subsystem 1230 allows network element 1210 to communicate with other network elements. Examples of protocols for communication subsystem 1230 include cellular, Ethernet, WiFi, WiLAN, among others.

Communications between the various elements of network element 1210 may be through an internal bus 1250 in one embodiment. However, other forms of communication are possible.

Further, the above may be implemented by any UE. One exemplary device is described below with regard to FIG. 13.

UE 1300 is typically a two-way wireless communication device having voice and data communication capabilities. UE 1300 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1300 is enabled for two-way communication, it may incorporate a communication subsystem 1311, including both a receiver 1312 and a transmitter 1314, as well as associated components such as one or more antenna elements 1316 and 1318, local oscillators (LOs) 1313, and a processing module such as a digital signal processor (DSP) 1320. As will be apparent to those skilled in the field of communications, the particular design of the communication subsystem 1311 will be dependent upon the communication network in which the device is intended to operate. The radio frequency front end of communication subsystem 1311 can be any of the embodiments described above.

Network access requirements will also vary depending upon the type of network 1319. In some networks network access is associated with a subscriber or user of UE 1300. A UE may require a removable user identity module (RUIM) or a subscriber identity module (SIM) card in order to operate on a CDMA network. The SIM/RUIM interface 1344 is normally similar to a card-slot into which a SIM/RUIM card can be inserted and ejected. The SIM/RUIM card can have memory and hold many key configurations 1351, and other information 1353 such as identification, and subscriber related information.

Figure 13:
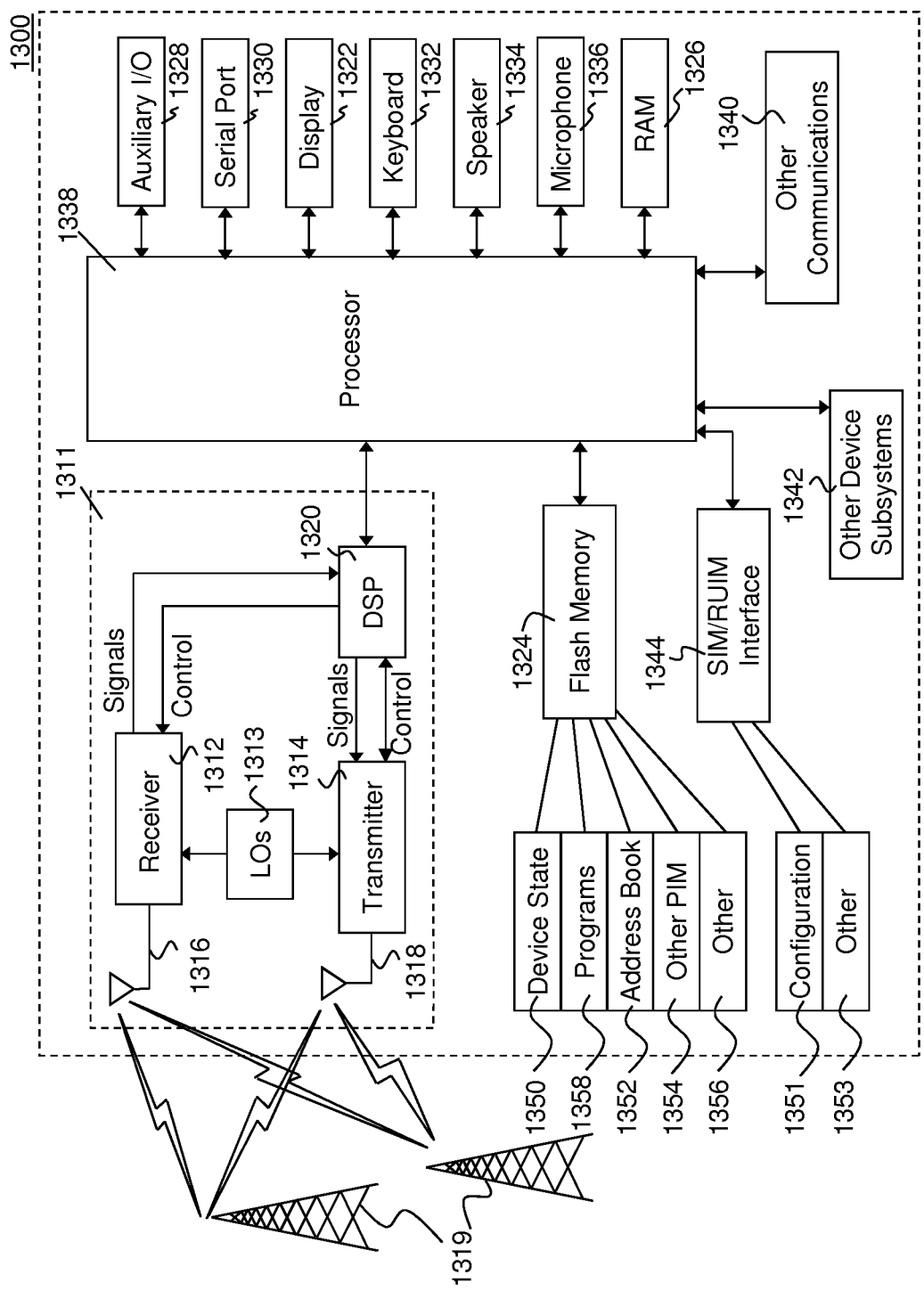
FIG. 13 is a block diagram of an example user equipment for use with the embodiments of the present disclosure.

When required network registration or activation procedures have been completed, UE 1300 may send and receive communication signals over the network 1319. As illustrated in FIG. 13, network 1319 can consist of multiple base stations communicating with the UE.

Signals received by antenna 1316 through communication network 1319 are input to receiver 1312, which may perform such common receiver functions as signal amplification, frequency down conversion, filtering, channel selection and the like. ND conversion of a received signal allows more complex communication functions such as demodulation and decoding to be performed in the DSP 1320. In a similar manner, signals to be transmitted are processed, including modulation and encoding for example, by DSP 1320 and input to transmitter 1314 for digital to analog conversion, frequency up conversion, filtering, amplification and transmission over the communication network 1319 via antenna 1318. DSP 1320 not only processes communication signals, but also provides for receiver and transmitter control. For example, the gains applied to communication signals in receiver 1312 and transmitter 1314 may be adaptively controlled through automatic gain control algorithms implemented in DSP 1320.

UE 1300 generally includes a processor 1338 which controls the overall operation of the device. Communication functions, including data and voice communications, are performed through communication subsystem 1311. Processor 1338 also interacts with further device subsystems such as the display 1322, flash memory 1324, random access memory (RAM) 1326, auxiliary input/output (I/O) subsystems 1328, serial port 1330, one or more keyboards or keypads 1332, speaker 1334, microphone 1336, other communication subsystem 1340 such as a short-range communications subsystem and any other device subsystems generally designated as 1342. Serial port 1330 could include a USB port or other port known to those in the art.

Some of the subsystems shown in FIG. 13 perform communication-related functions, whereas other subsystems may provide "resident" or on-device functions. Notably, some subsystems, such as keyboard 1332 and display 1322, for example, may be used for both communication-related functions, such as entering a text message for transmission over a communication network, and device-resident functions such as a calculator or task list.

Operating system software used by the processor 1338 may be stored in a persistent store such as flash memory 1324, which may instead be a read-only memory (ROM) or similar storage element (not shown). Those skilled in the art will appreciate that the operating system, specific device applications, or parts thereof, may be temporarily loaded into a volatile memory such as RAM 1326. Received communication signals may also be stored in RAM 1326.

As shown, flash memory 1324 can be segregated into different areas for both computer programs 1358 and program data storage 1350, 1352, 1354 and 1356. These different storage types indicate that each program can allocate a portion of flash memory 1324 for their own data storage requirements. Processor 1338, in addition to its operating system functions, may enable execution of software applications on the UE. A predetermined set of applications that control basic operations, including at least data and voice communication applications for example, will normally be installed on UE 1300 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1319. Further applications may also be loaded onto the UE 1300 through the network 1319, an auxiliary I/O subsystem 1328, serial port 1330, short-range communications subsystem 1340 or any other suitable subsystem 1342, and installed by a user in the RAM 1326 or a non-volatile store (not shown) for execution by the processor 1338. Such flexibility in application installation increases the functionality of the device and may provide enhanced on-device functions, communication-related functions, or both. For example, secure communication applications may enable electronic commerce functions and other such financial transactions to be performed using the UE 1300.

In a data communication mode, a received signal such as a text message or web page download will be processed by the communication subsystem 1311 and input to the processor 1338, which may further process the received signal for output to the display 1322, or alternatively to an auxiliary I/O device 1328.

A user of UE 1300 may also compose data items such as email messages for example, using the keyboard 1332, which may be a complete alphanumeric keyboard or telephone-type keypad, among others, in conjunction with the display 1322 and possibly an auxiliary I/O device 1328. Such composed items may then be transmitted over a communication network through the communication subsystem 1311.

For voice communications, overall operation of UE 1300 is similar, except that received signals would typically be output to a speaker 1334 and signals for transmission would be generated by a microphone 1336. Alternative voice or audio I/O subsystems, such as a voice message recording subsystem, may also be implemented on UE 1300. Although voice or audio signal output is generally accomplished primarily through the speaker 1334, display 1322 may also be used to provide an indication of the identity of a calling party, the duration of a voice call, or other voice call related information for example.

Serial port 1330 in FIG. 13 would normally be implemented in a personal digital assistant (PDA)-type UE for which synchronization with a user's desktop computer (not shown) may be desirable, but is an optional device component. Such a port 1330 would enable a user to set preferences through an external device or software application and would extend the capabilities of UE 1300 by providing for information or software downloads to UE 1300 other than through a wireless communication network. The alternate download path may for example be used to load an encryption key onto the device through a direct and thus reliable and trusted connection to thereby enable secure device communication. As will be appreciated by those skilled in the art, serial port 1330 can further be used to connect the UE to a computer to act as a modem.

Other communications subsystems 1340, such as a short-range communications subsystem, is a further optional component which may provide for communication between UE 1300 and different systems or devices, which need not necessarily be similar devices. For example, the subsystem 1340 may include an infrared device and associated circuits and components or a Bluetooth™ communication module to provide for communication with similarly enabled systems and devices. Subsystem 1340 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a network element for providing parameters to a first user equipment served by the network element, the parameters describing at least a second user equipment for the purpose of the first user equipment initiating a device to device proximity discovery service with the second user equipment, the method comprising:

collecting information for user equipments desiring device to device proximity discovery;

creating a candidate user equipment list for a candidate tier based on the collected information at the network element and one or more thresholds of the candidate tier, wherein the one or more thresholds are based on timing advance values in use at the first or the at least the second user equipment; and providing the parameters describing at least a second user equipment to the first user equipment.

2. The method of claim 1 further comprising: creating the candidate user equipment list based on one or more of: a minimum power of a signal from the at least the second user equipment as received at the first user equipment; a time of arrival of signals at the first and the at least the second user equipment; a time of flight of signals at the first and at least second user equipment or an estimate of the geographical distance from the first user equipment to the at least second user equipment.

3. The method of claim 1, wherein the collected information includes information provided by the first and at least second user equipments, the provided information including capability information for the user equipments.

4. The method of claim 3, wherein the collected information further includes at least one of identity information for the first and at least second user equipments, location information for the first and at least second user equipments, and channel information for the first and at least second user equipments.

5. The method of claim 3, wherein the capability information is provided in a radio resource control message.

6. The method of claim 5, wherein the capability information is provided in a third generation partnership project radio resource control message selected from: a UECapabilityInformation message; a UEInformationResponse message; an RRCConnectionRequest message; an RRCConnectionReconfigurationComplete message; an RRCConnectionReestablishmentRequest message; and a MeasurementReport message.

7. The method of claim 3, wherein the capability information is provided in a Medium Access Control Control Element.

8. The method of claim 1, wherein the collecting is initiated based on a proximity discovery initiation request from the network element.

9. The method of claim 8, wherein the proximity discovery initiation request is part of a radio resource control connection request.

10. The method of claim 1, further comprising, prior to the collecting information, receiving a request from the first user equipment to initiate proximity discovery.

11. The method of claim 10, wherein the request is part of a radio resource control message.

12. The method of claim 11, wherein the radio resource control connection request is one of a third generation partnership project RRCConnectionRequest message; UEInformationResponse message; RRCConnectionREcondfiguationComplete message; RRCConnectionReestablishmentRequest message; and a MeasurementReport message.

13. The method of claim 10, wherein the request is provided in a Medium Access Control Control Element.

14. The method of claim 1, wherein the collecting further comprises:

sending a message to the at least second user equipment;

receiving a response from the at least second user equipment, wherein the response indicates whether the at least second user equipment is willing to participate in proximity discovery initiation.

15. The method of claim 1, further comprising a plurality of candidate tiers, each tier having a different threshold or set of thresholds.

16. The method of claim 1, wherein the signals at the first and at least second user equipments are physical layer uplink or downlink signals.

17. The method of claim 16, wherein the physical layer signals are selected from the group consisting of one or more of: a sounding reference signal, reference signals on physical uplink control channel, or an aperiodic signal including a demodulation reference signal, random access channel, or a dedicated random access channel.

18. The method of claim 16, wherein the physical layer signals at the first and at least second user equipments are dedicated for proximity discovery.

19. A network element for providing parameters to a first user equipment served by the network element, the parameters describing at least a second user equipment for the purpose of the first user equipment initiating a device to device proximity discovery service with the second user equipment, the network element comprising:

a processor; and a communications subsystem, wherein the network element is configured to:

collect information for user equipments desiring device to device proximity discovery;

create a candidate user equipment list for a candidate tier based on the collected information at the network element and one or more thresholds of the candidate tier, wherein the one or more thresholds are based on timing advance values in use at the first or the at least the second user equipment; and provide the parameters describing at least a second user equipment to the first user equipment.

20. The network element of claim 19, wherein the processor is further configured to create the candidate user equipment list based on one or more of: a minimum power of a signal from the at least the second user equipment as received at the first user equipment; a time of arrival of signals at the first and the at least the second user equipment; a time of flight of signals at the first and at least second user equipment or an estimate of the geographical distance from the first user equipment to the at least the second user equipment.

21. A non-transitory computer readable medium storing program code executable by a processor for providing parameters to a first user equipment served by a network element, the parameters describing at least a second user equipment for the purpose of the first user equipment initiating a device to device proximity discovery service with the second user equipment, comprising:

collecting information for user equipments desiring device to device proximity discovery;

creating a candidate user equipment list for a candidate tier based on the collected information at the network element and one or more thresholds of the candidate tier, wherein the one or more thresholds are based on timing advance values in use at the first or the at least the second user equipment; and providing the parameters describing at least a second user equipment to the first user equipment.

22. A method at a network node to provide to a first user equipment parameters describing a second user equipment for the purpose of the first user equipment initiating a device to device proximity discovery service with the second user equipment, the method comprising:
- sending a request to the second user equipment;
- receiving a response from the second user equipment, including whether the second user equipment is willing to participate in proximity discovery;
- determining a candidate user equipment list for a tier of user equipments; and
- sending a second response to the first user equipment, wherein the determining is based on a threshold or set of thresholds using timing advance values in use at the first or the at least the second user equipment.

23. The method of claim 22, further comprising, receiving, from the user equipment, a request for proximity discovery initiation, prior to the sending the request.

24. A method at a network node to provide to a first user equipment parameters describing a second user equipment for the purpose of the first user equipment initiating a device to device proximity discovery service with the second user equipment, the second user equipment being served by a second network node, the method comprising:
- sending a request to the second network node;
- receiving a response from the second network node, including whether the second user equipment served by the second network node is willing to participate in proximity discovery;
- determining a candidate user equipment list for a tier of user equipments; and
- sending a second response to the first user equipment, wherein the determining is based on a threshold or set of thresholds using timing advance values in use at the first or the at least the second user equipment.

25. The method of claim 24, further comprising, receiving, from the user equipment, a request for proximity discovery initiation, prior to the sending of the request.

\* \* \* \* \*